Feb. 14, 1939.　　　　W. W. KUYPER　　　　2,147,490
LINE DROP COMPENSATOR
Original Filed Sept. 23, 1936
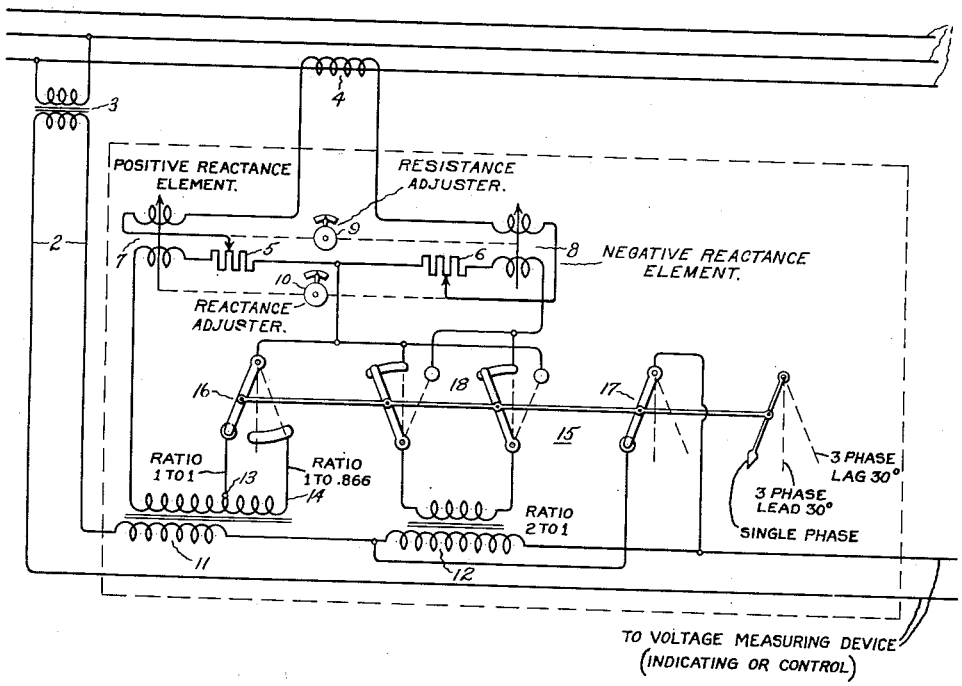
Inventor:
William W. Kuyper,
by Harry E. Dunham
His Attorney.

Patented Feb. 14, 1939

2,147,490

UNITED STATES PATENT OFFICE 2,147,490

LINE DROP COMPENSATOR

William W. Kuyper, Lynn, Mass., assignor to General Electric Company, a corporation of New York Application September 23, 1936, Serial No. 102,221
Renewed June 15, 1938

15 Claims. (Cl. 171—119)

My invention relates to line drop compensators and more particularly to improvements in line drop compensators adapted for use with single phase feeder voltage regulators which are connected open-delta on three phase alternating current circuits.

It is often desirable to know the voltage on a circuit at a remote point to which it is not convenient to run the wires of a voltage measuring circuit. Usually the difference in voltage between the remote point and the point at which it is convenient to connect a voltage measuring circuit or device to the main circuit is caused by the voltage drop in the main circuit between these two points. This voltage drop is proportional to the product of the current in the main circuit and the impedance of the main circuit between the two points. The impedance usually comprises a resistance component and a reactance component, the voltage drops in which are 90° out of phase with respect to each other.

A line drop compensator is a device for compensating a voltage measuring circuit for the voltage drop in the main circuit between the points on the main circuit to which the voltage measuring device is connected and a remote point on the main circuit, such for example as a so-called center of distribution. A conventional line drop compensator consists of a resistance element and a reactance element through which a current variable in magnitude and phase with the current in the main circuit is passed. The resistance and reactance elements are so adjusted with respect to the current passed through them and with respect to the voltage of the voltage measuring circuit that the voltage drops in these elements bear the same relation to the voltage applied to the voltage measuring circuit or device as do the resistance and reactance voltage drops in the main circuit to the voltage of the main circuit.

One of the commonest uses of line drop compensators is in connection with feeder voltage regulating systems. Most electrical distribution systems are provided with sub-stations in which are installed one or more feeder voltage regulators. The sub-station is usually not located at the center of distribution at which it is desired to hold rated voltage and consequently the control circuits for the regulators have to be compensated for the line drop between the regulators and the center of distribution. When the regulated feeder circuit is a single phase circuit, the application of line drop compensators is simple because at unity power factor on such circuits, the current and voltage are in phase with each other, and consequently the line current can be transformed in a simple straight-forward manner by means of current transformers and applied directly to the line drop compensators.

When the regulated feeder circuits are three-phase circuits, however, there has in the past been a considerable problem in connection with the line drop compensators. This problem in part arises from the fact that one of the simplest and easiest ways to regulate the voltage of such circuits is by connecting two single phase regulators in open-delta to the three-phase circuit. With such a connection, one regulator varies the voltage of one of the line conductors of the three-phase circuit and the other regulator varies the voltage of another of the conductors of the three-phase circuit and due to the normal equilateral triangle formed by the line to line voltage vectors of a balanced voltage three-phase circuit no regulator is needed in the third conductor and proper operation of two regulators in two of the conductors will maintain substantially balanced line voltage on the three-phase circuit. The feeder regulators are usually variable ratio transformers of either the tap-changing type or induction type, and they each consist essentially of a series winding connected in one of the line conductors and an exciting or primary winding connected between the conductor in which the series winding is connected and one of the other circuit conductors. Consequently, in connecting a single-phase regulator to a single-phase circuit connection need only be made to two line conductors. Unfortunately, however, there is at unity power factor on three-phase circuits a 30° phase displacement between the line to line voltage and the current in each of the lines between which the voltage is measured. Consequently, if an ordinary line drop compensator is connected to carry current which varies in magnitude and phase with the current in one of the lines of the three-phase circuit between which line and one of the other lines the voltage measuring circuit is connected, true line drop compensation will not be secured.

Various ways of correcting for this 30° phase angle difference have been used in the past, but they have all had disadvantages. One method has been to use additional current transformers so interconnected as to produce a resultant current, for application to the line drop compensator element, which is shifted 30° in phase. Such arrangements, however, are expensive as they require the additional current transformers and, furthermore, they usually require connection to the third conductor of the three-phase circuit which is undesirable. Another way has been to keep the 30° phase shift, but vary the settings of the resistance and reactance elements so as to produce a resultant impedance of the line drop compensator which is shifted through a 30° angle. This, however, requires somewhat advanced calculation and is beyond the ability of most substation operators and power company linemen who are charged with setting the line drop compensators.

In accordance with my invention, I provide a line drop compensator which is adapted to secure its entire energization from a single current transformer connected in one of the conductors between which and another of the conductors of a three-phase circuit the voltage measuring circuit is connected, and which has resistance and reactance elements which can be set directly in accordance with the resistance and reactance of the line whose drop is to be compensated for, just as with single phase compensators.

An object of my invention is to provide a new and improved line drop compensator.

My invention will be better understood from the following description taken in connection with the accompanying drawing and its scope will be pointed out in the appended claims.

Referring now to the single figure of the accompanying drawing, I have shown therein diagrammatically an embodiment of my invention in combination with a three-phase power circuit 1 and a voltage measuring circuit 2 which is connected to respond to the voltage between two of the lines of circuit 1 by means of a potential transformer 3. A current transformer 4 connected in one of the lines between which potential transformer 3 is connected serves to supply the operating current for my line drop compensator. The compensator is provided with two resistance elements 5 and 6 and two reactance elements 7 and 8. The resistance element 5 and the reactance element 8 are set directly for a numerical value corresponding to the resistance of the circuit 1, just as the resistance element of any conventional line drop compensator adapted for single phase operation is set. Likewise, the reactance element 7 and the resistance element 6 are set directly for a numerical value corresponding to the reactance of circuit 1, just as the reactance element of any conventional line drop compensator adapted for single phase operation is set.

While the resistance and reactance elements 5 and 8 may be set independently of each other and the reactance and resistance of elements 7 and 6 may be set independently of each other, it is preferable to provide a common resistance adjuster for simultaneously adjusting the elements 5 and 8. Such an adjuster is illustrated schematically at 9. Likewise, it is preferable that the elements 7 and 6 be capable of simultaneous adjustment by means of a common member which is shown schematically as the reactance adjuster 10. The resistance elements 5 and 6 may be of any well-known type and are shown as ordinary rheostats. The reactance elements may also be of any well-known type, and they are shown by way of example as reactance transformers having relatively rotatable windings for varying their mutual inductance and thereby varying the voltage induced in their secondary windings by their primary windings.

The energizing circuit for the elements of the compensator is a series circuit including the primary windings of the reactance elements 7 and 8 and such adjustable portions of resistance elements 5 and 6 as are determined by the setting of these elements. Its current is obtained from current transformer 4. The current flowing in this circuit causes reactance voltages to be produced in the secondary windings of the reactance elements 7 and 8 and resistance voltage drops to be produced in resistance elements 5 and 6, which voltages are proportional to the product of the current in circuit 1 and the resistance and reactance values of the elements of the compensator.

The elements of the compensator are arranged to have their voltages inserted in the voltage measuring circuit 2 by means of a pair of transformers 11 and 12. Transformer 11 is a variable ratio transformer having a 1:1 ratio tap 13 and a 1:.886 ratio tap 14. The transformer 12 has a 2:1 ratio.

The connections between the resistance and reactance elements of the compensator and transformers 11 and 12 are controlled by means of switching apparatus which may consist of a plurality of separately operable switches but which preferably are combined by means of a common operating mechanism into a three-position adapter switch 15. In one position of this switch, the compensator is adapted for single-phase operation, in a second position it is adapted for three-phase operation when the line current leads the line to line voltage by 30° and in the remaining position is adapted for three-phase operation when the line current lags the line to line voltage by 30°.

The operation of the illustrated embodiment of my invention is as follows:

With the switch 15 in the position shown, the compensator is adapted for single-phase operation in that the resistance and reactance elements 5 and 7 are connected in the voltage measuring circuit through a 1:1 ratio transformer by means of an element 16 of switch 15. An element 17 of the switch 15 short-circuits the secondary winding of the 2:1 ratio transformer 12. With this setting of the adapter switch, the compensator is the equivalent of a conventional compensator, and the resistance element 5 and reactance element 7 when set to have values corresponding to the resistance and reactance of the circuit 1, will produce voltages in the voltage measuring circuit which have the same relation to the voltage of this circuit as the actual resistance and reactance drops in the main circuit 1 have with respect to the voltage of the main circuit.

The switch 15 has a reversing switch element 18 which connects the elements 6 and 8 to the transformer 12, thereby in effect short-circuiting them. This is in order to reduce to a minimum the losses in the compensator and the volt-ampere drain on the current transformer 4 during single-phase operation of the compensator.

It should, of course, be understood that with the potential transformer 3 and the current transformer 4 connected to the three-phase circuit as shown, the above arrangement will not give true line drop compensation because there is a 30° phase difference between the potential produced by the potential transformer and the current produced by the current transformer at unity power factor on circuit 1. However, if the lower two conductors of the three-phase circuit 1 are imagined to be a single phase circuit in which the current and voltage are in phase at unity power factor, then the device will give true line drop compensation for the single phase setting of the switch 15.

If now the switch 15 is moved to its mid-position, labeled "three-phase lead 30°", the switch element 16 will connect the resistance element 5 and the reactance element 7 to the 1:.866 ratio tap on the transformer 11, and the switch element 17 will remove the short circuit about the 2:1 ratio transformer 12. If now the reactance element 8 has been so connected or adjusted that it has a negative sign with respect to the reactance element 7, the various resistance and reactance elements will have the following values when referred to the voltage measuring circuit 2.

First assume that the absolute numerical magnitudes of the resistance element 5 and reactance element 8 are $r$ ohms and that the absolute numerical magnitude of the reactance element 7 and resistance element 6 are $x$ ohms. Then the resistance element 5 and reactance element 7, when referred to the voltage measuring circuit 2, will be $.866r$ and $.866x$ because of the ratio of the transformer 11. Similarly, because of the 2:1 ratio of the transformer 12 and the connections of the switch elements 17 and 18, the value of the resistance element 6 will be $+\frac{1}{2}x$ and the value of reactance element 8 will be $-\frac{1}{2}r$.

Now if R stands for the total resistance value necessary to secure true resistance compensation for any connection of the compensator and X stands for the total reactance value necessary to secure true compensation for any connection of the compensator, it is clear that for single-phase operation $R=r$ and $X=x$. It can also be shown that when the current leads the voltage by 30° R should equal $$\frac{\sqrt{3}}{2}r + \tfrac{1}{2}x$$

and X should equal $$\frac{\sqrt{3}}{2}x - \tfrac{1}{2}r$$

From the preceding paragraph it will be seen that this is precisely what the compensator produces with the adapter switch 15 in the mid-position because, when referred to the voltage measuring circuit 2, the sum of the two resistance elements 5 and 6 is $.866r + \frac{1}{2}x$ ($.866$ being the same as the $\sqrt{3}/2$), while the sum of the two reactance elements 7 and 8 is $.866x - \frac{1}{2}r$.

When the adapter switch 15 is moved to the right so as to give proper line drop compensation for 30° lag, the only difference in the connections is that reversing element 18 reverses the connections between the elements 6 and 8 on the one hand and the 2:1 ratio transformer 12 on the other hand. This causes resistance element 6 to insert a value corresponding to $-\frac{1}{2}x$ in the voltage measuring circuit and causes the reactance element 8 to insert a value corresponding to $+\frac{1}{2}r$. This will then give true line drop compensation for this condition, because it can be shown that for 30° lag the proper value for R is $.866r - \frac{1}{2}x$, and the proper value for X is $.866x + \frac{1}{2}r$.

It will be observed that 0.866 is equal to the cosine of 30 degrees and 0.5 is equal to the sine of 30 degrees. The generalization can therefore be made that if the tap 14 on the transformer 11 has a value corresponding to the cosine of any angle $\theta$ between the potential applied to the potential transformer 3 and the current in the current transformer 4 at unity power factor on the main circuit and if the ratio of transformer 12 corresponds to the sine of this angle, the compensator will give correct line drop compensation for any given angle.

While I have shown and described a particular embodiment of my invention, it will be obvious to those skilled in the art that changes and modifications can be made, and I, therefore, aim in the appended claims to cover all such changes and modifications as fall within the true spirit and scope of my invention.

What I claim as new and desire to secure by Letters Patent of the United States, is:

1. In a line drop compensator, a pair of opposite sign resistance and reactance elements, a voltage measuring circuit, and means for simultaneously reversing the signs of said elements with respect to said voltage measuring circuit.

2. In a line drop compensator, means for inserting in a voltage measuring circuit two resistance voltages which are proportional respectively to .866 of an amount of resistance line drop to be compensated and one half of an amount of reactance line drop to be compensated, and means for similarly inserting two reactance voltages which are proportional respectively to .866 of an amount of reactance line drop to be compensated and one half of an amount of resistance line drop to be compensated.

3. In a line drop compensator, means for inserting in a voltage measuring circuit two resistance voltages which are proportional respectively to .866 of an amount of resistance line drop to be compensated and one half of an amount of reactance line drop to be compensated, and means for similarly inserting two reactance voltages which are proportional respectively to .866 of an amount of reactance line drop to be compensated one half of an amount of resistance line drop to be compensated, said half valued voltages being of opposite sign.

4. In a line drop compensator, means for inserting in a voltage measuring circuit two resistance voltages which are proportional respectively to .866 of an amount of resistance line drop to be compensated and one half of an amount of reactance line drop to be compensated, and means for similarly inserting two reactance voltages which are proportional respectively to .866 of an amount of reactance line drop to be compensated and one half of an amount of resistance line drop to be compensated, and means for selectively reversing the signs of said one half valued voltages.

5. In a line drop compensator, means for inserting in a voltage measuring circuit two resistance voltages which are proportional respectively to .866 of an amount of resistance line drop to be compensated and one half of an amount of reactance line drop to be compensated, means for similarly inserting reactance voltages which are proportional respectively to .866 of an amount of reactance line drop to be compensated and one half of an amount of resistance line drop to be compensated, said half valued voltages being of opposite sign, and means for reversing the signs of said half valued voltages.

6. In a line drop compensator, means for producing a pair of resistance voltage drops and a pair of reactance voltage drops, the voltage drop values in each pair being proportional respectively to the resistance and reactance components of an amount of line drop to be compensated, a voltage measuring circuit, means for inserting in said voltage measuring circuit .866 of the value of one of said resistance voltage drops and .866 of the value of one of said reactance voltage drops, and means for inserting in said voltage measuring circuit one half the values of the remaining two voltage drops.

7. In combination, an alternating current power line, a circuit for measuring the voltage of said line and a line drop compensator for compensating said measuring circuit for the voltage drop in said line produced in a given amount of the resistance and reactance of said line, said compensator having two resistance elements whose values are proportional respectively to said given amount of line resistance and line reactance and having two reactance elements whose values are proportional respectively to said given amount of line reactance and line resistance, transforming means for connecting said elements in said voltage measuring circuit, and switching means for controlling the connections between said elements and said transforming means so as to secure true line drop compensation regardless of whether said power line is single or three-phase.

8. A line drop compensator having a pair of simultaneously adjustable resistance and reactance elements which may be set directly in accordance with the resistance of a power line, a pair of simultaneously adjustable reactance and resistance elements which may be set directly in accordance with the reactance of said power line, a voltage measuring circuit, and means including a three-position adapter switch for making varying connections between said elements and said voltage measuring circuit whereby in one position of said switch said compensator gives true line drop compensation for single phase circuits, in another position of said switch said compensator gives true line drop compensation for three-phase circuits in which the line current lags the line to line voltage by 30° at unity power factor and in the remaining position of said switch said compensator gives true line drop compensation for three-phase circuits in which the line current leads the line to line voltage by 30° at unity power factor.

9. In a line drop compensator, means for producing a pair of resistance voltage drops which are respectively proportional in magnitude to the resistance and reactance component of an amount of line drop to be compensated, means for producing a pair of reactance voltage drops which are respectively proportional in magnitude to the reactance and resistance components of said amount of line drop to be compensated, a voltage measuring circuit, a pair of transformers for inserting said voltage drops in said circuit, and a three position adapter switch so arranged that in one position one of said resistance voltage drops and one of said reactance drops are inserted full value in said measuring circuit by one of said transformers, in the remaining two positions of said switch the remaining two voltage drops are inserted in said measuring circuit at half value by the remaining transformer while the ratio of the first transformer is so changed that it inserts .866 of the value of its associated voltage drops, said switch when it is moved from one to the other of said remaining two positions reversing the signs of said half valued voltage drops.

10. In a line drop compensator adapted for use with a three-phase power circuit, a control circuit which measures the voltage between two of the lines of said power circuit, resistance and reactance elements connected in said control circuit, means limited to a single current transformer for circulating in said elements an operating current which varies in accordance with the magnitude and phase of the current in one of said two lines, a resistance adjuster for making the resistance setting of said compensator directly in accordance with the resistance of said power circuit, a reactance adjuster for making the reactance setting of the compensator directly in accordance with the reactance of said power circuit, and means for so modifying the connections between said elements and said control circuit as to secure true line drop compensation.

11. A line drop compensator comprising in combination a pair of resistance elements whose values are proportional respectively to the resistance and reactance of a given amount of line whose voltage drop is to be compensated, a pair of positive and negative reactance elements whose values are proportional respectively to the reactance and resistance of said given amount of line whose voltage drop is to be compensated, a transformer having a one to one ratio tap and a one to .866 ratio tap, a transformer having a two to one ratio, and multi-position switching means which in one position connects the resistance element which is proportional to the line resistance in series with the positive reactance element to said one to one ratio tap and short circuits said two to one ratio transformer, which in another position transfers the connections of said series connected elements to said one to .866 ratio tap, opens said short circuit and connects the remaining to elements in series to the primary winding of said two to one ratio transformer, and which in another position reverses the connections of said two to one ratio transformer.

12. A line drop compensator for connection in a circuit for measuring the voltage between two conductors of a power line and for energization by a current derived wholly from one of said conductors comprising, in combination, an adjustable resistance drop compensator which is set directly in terms of line resistance, said resistance compensator containing an impedance element which is effectively connected in said voltage measuring circuit, an adjustable reactance drop compensator which is set directly in terms of line reactance, said reactance compensator having an impedance element which is effectively connected in said voltage measuring circuit, and means including multi-position circuit controlling apparatus for selectively varying the circuit relationship between an impedance element of each of said compensators and the voltage measuring circuit, said apparatus having a first position for causing said compensator to give true line drop compensation for single phase power lines, said apparatus having a second position for causing said compensator to give true line drop compensation for three-phase power lines in which said conductor current lags said voltage between conductors by 30 degrees at unity power factor, said apparatus having a third position for causing said compensator to give true line drop compensation for three-phase power lines in which said conductor current leads said voltage between conductors by 30 degrees at unity power factor.

13. In a line drop compensator, means for inserting in a voltage measuring circuit compensator voltages composed of four voltage drop components, two of said components being resistance voltage drops proportional respectively to 0.866 of a desired amount of resistance line drop compensation and 0.5 of a desired amount of reactance line drop compensation, the other two components being reactance voltage drops which are proportional respectively to 0.866 of said amount of reactance line drop compensation and 0.5 of said amount of resistance line drop compensation, means for simultaneously and proportionately varying the magnitudes of said 0.866 valued resistance voltage drop component and said 0.5 valued reactance voltage drop component so as to adjust the resistance compensation of said compensator, and means for simultaneously and proportionately varying the magnitudes of said 0.866 valued reactance voltage drop component and said 0.5 valued resistance voltage drop component so as to adjust the reactance compensation of said compensator.

14. In a line drop compensator having potential and current circuits energized by the potential and current of a main circuit which are out of phase by the angle $\theta$ at unity power factor on the main circuit, means for inserting in said potential circuit compensator voltages composed of four voltage drop components, two of said components being resistance voltage drops proportional respectively to cosine $\theta$ of a desired amount of resistance line drop compensation and sine $\theta$ of a desired amount of reactance line drop compensation, the other two components being reactance voltage drops which are proportional respectively to cosine $\theta$ of said amount of reactance line drop compensation and sine $\theta$ of said amount of resistance line drop compensation.

15. In a line drop compensator having potential and current circuits energized by the potential and current of a main circuit which are out of phase by the angle $\theta$ at unity power factor on the main circuit, means for inserting in said potential circuit compensator voltages composed of four voltage drop components, two of said components being resistance voltage drops proportional respectively to cosine $\theta$ of a desired amount of resistance line drop compensation and sine $\theta$ of a desired amount of reactance line drop compensation, the other two components being reactance voltage drops which are proportional respectively to cosine $\theta$ of said amount of reactance line drop compensation and sine $\theta$ of said amount of resistance line drop compensation, means for simultaneously and proportionately varying the magnitudes of said cosine $\theta$ valued resistance voltage drop component and said sine $\theta$ valued reactance voltage drop component so as to adjust the resistance compensation of said compensator, and means for simultaneously and proportionately varying the magnitudes of said cosine $\theta$ valued reactance voltage drop component and said sine $\theta$ valued resistance voltage drop component so as to adjust the reactance compensation of said compensator.

WILLIAM W. KUYPER.